United States Patent [19]

Bond et al.

[11] Patent Number: 4,795,778

[45] Date of Patent: Jan. 3, 1989

[54] ADHESIVE HALOGENATED CYCLIC CONJUGATED DIENE AND 1,2 POLYBUTADIENE

[76] Inventors: Karen M. Bond, 4951 General McClane Dr., Edinboro, Pa. 16412; Mark A. Weih, R.D. #2, Waterhouse Rd., Box 222A, Cambridge Spgs., Pa. 16403; Robert A. Auerbach, 126 Anderson Dr., Erie, Pa. 16509

[21] Appl. No.: 169,147

[22] Filed: Mar. 10, 1988

Related U.S. Application Data

[63] Continuation of Ser. No. 919,519, Oct. 16, 1986, abandoned.

[51] Int. Cl.[4] .................. C08L 47/00; C08K 5/07
[52] U.S. Cl. ........................ 524/551; 524/364; 525/288; 525/292
[58] Field of Search ............ 524/551, 364; 525/276, 525/288, 292, 297

[56] References Cited

U.S. PATENT DOCUMENTS

| | | | |
|---|---|---|---|
| 3,098,058 | 7/1963 | Schweiker | 525/292 |
| 3,268,475 | 8/1966 | Hoch | 525/292 |
| 3,325,464 | 6/1967 | Weil | 525/292 |
| 3,640,941 | 2/1972 | Findley | 525/292 |
| 3,692,872 | 9/1972 | Calderon | 525/292 |

FOREIGN PATENT DOCUMENTS 931915 7/1963 United Kingdom .

*Primary Examiner*—Christopher Henderson

[57] ABSTRACT

Compositions comprising at least one adduct of perhalogenated cyclic conjugated dienes and olefinically-unsaturated dienophiles having a vinyl content in excess of 50 percent have been found to be unexpectedly effective adhesive systems for bonding a variety of elastomeric materials, including vulcanizable and vulcanized natural and synthetic elastomer compositions, to themselves and other structural substrates.

2 Claims, No Drawings

ADHESIVE HALOGENATED CYCLIC CONJUGATED DIENE AND 1,2 POLYBUTADIENE

This application is a continuation, of application Ser. No. 06/919,519 filed Oct. 16, 1986 now abandoned.

Field of the Invention

This invention relates to adhesive compositions. More particularly, the invention relates to adhesive compositions suitable for bonding elastomeric materials, including both vulcanizable and vulcanized natural and synthetic elastomer compositions, at elevated temperatures to themselves and other solid structural substrates.

It is well-known to employ adhesive compositions for bonding elastomeric materials to various substrates, including elastomeric, fabric, metal and other solid structural substrates. In the as yet unconsummated search for the ideal all-purpose adhesive, there have been developed a variety of adhesive compositions which have been utilized with varying degrees of success in bonding elastomeric materials to themselves or to other substrates to form laminates and other composite articles. Such bonding has been effected over a wide range of conditions including temperature, pressure and length of bonding cycle, and has included both vulcanizable and vulcanized elastomer compositions. While obviously providing commercially acceptable results, the known prior art compositions are not without their deficiencies. For example, as a general rule, the known adhesives which have been effective as single-coat, i.e., primerless, rubber-to-metal bonding agents are quite often only useful in bonding specific elastomers to specific substrates, and thus are sadly lacking in versatility. This lack of versatility which is characteristic of the general class of one-coat adhesive systems can be partially alleviated by the use of two-coat adhesive systems, which utilize a primer coat applied over the metal substrate and a cover coat (which adheres well to the elastomer) interspersed between the elastomer and the primer. In addition to the problem of versatility, both the one-coat and two-coat adhesive systems suffer from one or more other disadvantages, including a general inability to afford optimum adhesion, particularly at elevated service temperatures; poor storage stability at room and/or elevated temperatures; poor precure heat tolerance, that is, the amount of exposure (at a certain time and temperature) prior to bonding that a heat activated adhesive system can tolerate without significant impairment to its adhesion potential; and the resistance of the adhesive bond to environmental conditions such as solvents, moisture and the like, is too often poorer than is normally desired in many commercial applications. The variety of prior adhesive systems available at any point in time has never precluded continued research toward the development of more acceptable adhesive materials; indeed, existing adhesive systems have generally inspired such research. particularly as new materials are developed which simply cannot be effectively bonded with existing adhesive compositions or new techniques are developed which require adhesive characteristics not found in existing adhesives.

Adhesive compositions which have been employed in the past have included admixtures of chlorinated rubber and polyalkylene polyamine adhesion promoter; mixtures of halogenated ethylene-propylene copolymer and sulfur; mixtures of chlorosulfonated polyethylene, organic isocyanates and dinitrosobenzene; chlorinated rubber-epoxylated novolak-epoxy resin curing agent admixtures; mixtures comprising chlorine-containing polymers, polyisocyanates, epoxy resins, organosilanes and dinitrosobenzene; and the like.

Adhesive compositions which have been widely used commercially are disclosed in Coleman et al U.S. Pat. No. 3,258,388, which provides for the incorporation of poly-C-nitroso aromatic compounds into conventional rubber-to-metal adhesives to improve rubber-to-metal adhesion. The conventional adhesives include compositions containing thermosetting condensation polymers; polymers and copolymers of polar ethylenically unsaturated materials, halogenated rubbers, and polyisocyanates. The Coleman et al adhesive compositions provide good to excellent primary adhesion values with a wide variety of elastomers; however such compositions do not bond well if poly-C-nitroso aromatic compounds are not included in the formulations.

Findley et al U.S. Pat. No. 3,640,941 disclose adhesive systems containing as necessary components a graft copolymer of polybutadiene and halogenated cyclopentadiene monomer, dibasic lead phosphite, and resorcinol. While excellent adhesives for some natural and synthetic rubbers, they are not effective with non-polar rubbers such as butyl rubber, EPR and EPT rubbers, and the like, nor with vulcanized stock.

The search continues for more effective adhesive formulations which can be employed to bond elastomeric materials, including both vulcanizable and vulcanized elastomer compositions to themselves and other substrates over a broad spectrum of bonding conditions; which are shelf-stable for extended periods of use; which can be employed with a variety of elastomers, including low durometer natural rubber, and substrates; and which exhibit good precure heat tolerance, good layover and are resistant to degradation from environmental factors.

It is an object of this invention to provide adhesive compositions for bonding a variety of elastomers at elevated temperatures to various substrates, particularly metal substrates.

It is another object of this invention to provide adhesive compositions which are effective to bond low durometer, natural rubbers at elevated temperatures to various substrates.

These and other objects, aspects and advantages of the invention, including a method for bonding elastomeric materials to substrates, and adhesively-joined elastomer-substrate composites, will be readily apparent from a consideration of the specification and the appended claims.

In accordance with this invention it has been discovered that compositions comprising at least one Diels-Alder adduct of at least one halogenated cyclic conjugated diene and at least one olefinically unsaturated polymeric dienophile characterized by a high vinyl content are unexpectedly effective as adhesive materials for bonding both vulcanized and vulcanizable elastomers, including sulfur-vulcanizable and free radical-vulcanizable elastomers, to themselves or other solid structural substrates. If desired, conventional additives such as fillers, eyes, pigments, extenders, and the like can be incorporated into the novel compositions of the invention. The compositions of this invention are characterized by the unexpected ability to provide strong rubber-to-metal bonds even in the complete absence of curing agents or adhesion promoters such as quinoid compounds and aromatic nitroso compounds, although the performance of the invention adhesives can be favorably improved if such compounds are employed. The adhesive compositions do not require priming of the metal surface; however, the use of conventional substrate primer compositions may enhance the strength of the adhesive bond. Thus, the compositions of this invention have been found to be effective as one-coat adhesive materials for natural and synthetic elastomers and as two-coat adhesive materials when used with conventional substrate primers. Besides providing excellent primary adhesion with both vulcanized and vulcanizable natural and synthetic elastomers, the compositions of the invention exhibit excellent shelf-life stability., excellent resistance to sweeping during injection or transfer type molding operations and are highly stable at environmental conditions of use.

The essential component of the adhesive compositions of this invention comprises the Diels-Alder adducts of at least one halogenated cyclic conjugated diolefin and at least one polyalkadiene dienophile having a high vinyl content. The vinyl content is the proportion of polydiene units bounded together in the 1,2-mode of addition to form pendant vinyl groups and is quantitatively determined by infrared absorption spectroscopy at 11.0 micron, using a solution of approximately 2.5 grams of polymer in 100 milliliters of anhydrous carbon disulfide. The Diels-Alder adducts have a halogen content in the range from 26 to 35, weight percent, based on total weight of adduct material. The adhesive compositions of the invention are compounded with an appropriate inert solvent or diluent to provide an adhesive lacquer having a viscosity in the range from 25 to 5000, preferably 125 to 400, centipoises at a total solids content (TSC) in the range from 5 to 40, preferably 10 to 35, percent. If desired, conventional additives such as are normally used in adhesive compositions, e.g., fillers, colorants, extenders, and the like, can be included in the adhesive formulations of the invention.

The Diels-Alder adducts which must be employed in the practice of this invention comprise the adduct of at least one halogenated cyclic conjugated diene and at least one polyalkadiene dienophile having a high vinyl content. The polyalkadiene is more particularly characterized by a vinyl content of at least 50 percent, preferably of at least 70 percent, and most preferably is in the range from 88 to 98 percent, based on total of olefinic unsaturation.

The halogenated cyclic conjugated dienes which are employed in forming the adducts for use in this invention have the formula

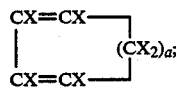

wherein X is a halogen selected from the group consisting of chlorine, bromine and fluorine, with chlorine being currently prefrred and a being 1, 2 or 3, preferably 1. The halogenated cyclodienes are readily prepared by well-known methods and at least one, hexachlorocyclopentadiene, is a well-known article of commerce. Other representative dienes include hexafluorocyclopentadiene, hexabromo cycyclopentadiene, 5,5-difluorotetrachorocyclopentadiene and 5,5-dibromotetrachlorocyclopentadiene.

The polyalkadiene dienophiles which are reacted with halogenated cyclic conjugated dienes to form the adducts which are employed in the adhesive compositions of this invention are, as noted, characterized by a vinyl content of at least 50 percent. The dienophiles are further characterized by having an elongated backbone carbon chain which is characterized by the presence of a predominant amount of pendant non-terminal vinyl groups attached to alternating carbon atoms of the backbone of the polyalkadiene to provide the structure

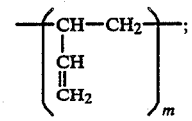

wherein m is a measure of the degre of polymerization. As noted, the vinyl groups constitute at least 50 percent, preferably 70 to 98 percent and especially 88 to 98 percent of the residual olefinic unsaturation of the dienophile. The polyalkylene dienophiles are further characterized by having molecular weights in the range from 500 to 200,000, preferably 10,000 to 120,000, and most preferably 35,000 to 120,000. Thus, it will be seen that the polyalkadiene dienophiles which can be employed in the practice of this invention include liquid polymers and solid gum polymers.

The polyalkadiene materials which are suitable for use in forming the adhesive compositions described herein are polymeric materials selected from the group consisting of polyalkadienes, hydroxyl-terminated polyalkadienes, chain-extended hydroxyl-terminated polyalkadienes, carboxyl-terminated polyalkadienes, chain-extended carboxyl-terminated polyalkadienes, mercaptan-terminated polyalkadienes, chain-extended mercaptan-terminated polyalkadienes, amine-erminated polyalkadienes, chain-extended amine-terminated polyalkadienes, and their equivalents. Where used in this specification and claims, the term "polyalkadiene" is understood to refer to polymers of at least one conjugated diene having from 4 to 12 carbon atoms and includes copolymers of at least one such conjugated diene and at least one other monomer copolymerizable therewith. As noted, the polyalkadienes can be unmodified, e.g., polybutadiene, poly(butadiene-styrene), and the like; or modified, as by having hydroxyl or carboxyl termination and including chain-extended hydroyl-terminated and carboxyl-terminated polymeric materials. As noted, the polyalkadienes can be either liquid polymers or solid gum polymers. In this regard, the hydroyl-substituted, carboxyl-substituted, amine-substituted and mercaptan-substituted polyalkadienes as produced by the majority of the present commercial polymerization processes generally are liquid polymers having molecular weights in the range of about 500 to about 20,000; with the bulk of such substituted polyalkadienes having molecular weights in the range of about 750 to about 3,000. Thus, it will be appreciated that the hydroxyl-, carboxyl-, amine- and mercaptan-substituted polyalkadienes will normally be chain-extended in order to increase their molecular weights to the ranges found most suitable in the present invention. Especially preferred dienophiles are 1,2-polybutadiene homopolymers.

The hydroxyl-substituted, carboxyl-substituted, amine-substituted, and mercaptan-substituted polyalkadiene dienophiles can be readily modified to the desired molecular weight range by conventional chain extension techniques, as by contacting the polyalkadiene prepolymer with a polyfunctional organic chain extender with thorough mixing, desirably followed by degassing. Chain extending reaction conditions are well-known in the art and will not be discussed here in great detail. As an example of such reaction conditions, the chain extension of a dihydroxy polyalkadiene prepolymer with a diisocyanate chain-extender such as 2,4-toluene diisocyanate is effected at room temperature or at moderately elevated temperatures. As is well-known in the art, the reaction conditions are a function of the materials employed and these conditions can be readily determined by one skilled in the art. The resulting chain-extended polyalkadiene has a substantially increased molecular weight range and, in physical appearance, can be a highly-viscous fluid or solid gum. A full description of the chain extension of reactive substituted polyalkadiene dienophiles, inluding representative chain extending compounds, is found in Polaski U.S. Pat. No. 3,894,982, particularly from Col. 5, line 16 through Col. 8, line 51, which disclosure is incorporated herein by reference.

The adducts which are used in the practice of the invention are readily prepared by conventional techniques well-known in the field of Diels-Alder reactions. In general, the Diels-Alder adduction between the halogenated cyclic diene and the high vinyl dienophiles is effected in an organic solvent such as xylene in relative amounts such that the stoichiometric ratio between the halogenated cyclic conjugted diene and the double bonds of the dienophile is in the range of 0.01 to 1. The mixture is heated at temperatures in the range from 100° C. to 200° C. Within this temperature range, the adduction reaction is exothermic and yields are quite often quantitative. The reaction is continued for a time sufficient to substantially react the halogenated cyclic conjugated diene and the high vinyl dienophile to provide an adduct having a halogen content in the range from 26 to 35, percent by weight, based on the total weight of the adduct. The halogen content of the adduct can be determined by known analytical procedures, such as Schoniger combustion.

Various conventional additives, such as filler, colorants, supplemental film formers and the like, can be included in the adhesive compositions of the present invention without deleteriously affecting the advantageous properties thereof. Quite often, the inclusion of additives may enhance the viscosity and other properties desirably from the standpoint of application of the adhesive. Representative of suitable filler materials are finely divided substantially inert solid materials such as carbon black, zinc oxide and titanium dioxide. Such conventional additives can be used in amounts corresponding to the customary ranges at which these additives are normally employed, e.g., in the range of about 15 to about 100 parts by weight per 100 parts by weight of polyalkadiene compound.

The adhesive compositions of this invention are prepared by conventional procedures. The resulting homogeneous mixtures are preferably diluted with an inert solvent or diluent such as acetone, methyl ethyl ketone, benzene, toluene, xylene, and the like, including mixtures of such solvents/diluents, to afford an adhesive lacquer having a viscosity in the range from 100 to 5000, preferably 125 to 400, centipoises at a total solids content in the range from 5 to 40, preferably 10 to 35, percent.

The adhesive compositions of the present invention have been found to be particularly suitable for bonding a wide variety of elastomeric materials, including both vulcanized and vulcanizable elastomeric materials, to themselves or to other substrates, particularly inorganic substrates. Elastomers which can be bonded include natural rubber, polychloroprene rubber, styrenebutadiene rubber, nitrile rubber, and the like. Substrates other than the elastomers per se which can be effectively bonded include fabrics such as fiberglass, polyamides, polyesters, aramids, e.g., Kevlar, a trademark of E. I. duPont de Nemours and Co., (Inc.), Wilmington, Del., and the like; and metals and their alloys such as steel, stainless steel, lead, aluminum, copper, brass, bronze, Monel metals, nickel, zinc, and the like, including treated metals such as phosphatized steel, galvanized steel, and the like; glass; ceramics; and the like.

The adhesive compositions of the present invention are readily applied by conventional means, such as by. dipping, brushing, spraying, etc., to either or both of the surfaces to be joined. Where a primer is employed, the compositions can be applied directly over such primer coats. Generally, the adhesive compositions are allowed to dry after application to remove the solvent. This can be accomplished at ambient conditions in 30 to 60 minutes. Solvent evaporation rate can be increased by the use of heat, forced air, or both. As a general rule, forced drying temperatures should be maintained below 95° C.

The surfaces to be bonded are brought together with the dried adhesive face therebetween, and the assembly is heated in accordance with conventional practices. The exact conditions will depend upon the particular elastomer being bonded and whether or not it is cured. If the rubber is uncured, and curing is to be effected during bonding, the conditions will be dictated by the rubber compositin and will generally be at a temperature of from 140° C. to 200° C. for from 5 to 60 minutes. If the rubber is already cured, the bonding temperature may range from 90° C. to 180° C. for from 15 to 120 minutes.

The following examples are provided for purposes of illustrating the invention. It will be understood that the invention is not to be limited to these examples nor to the specific details enumerated. Parts are parts by weight unless other wise expressed.

In the examples, in bonding the elastomer to a metal substrate, unless otherwise noted the substrate surface is primed with a conventional chlorinated rubber-base primer coat. The assembly is then cured and the adhesive bond tested according to ASTM standard D-429, Method B, modified to 45° angle of pull.

The bonded structures are subjected to various tests, including room temperature (RT) pull, the boiling water test, and the salt spray test. In the RT pull test, the rubber body is peeled from the metal at a 45° angle using a Scott tensile tester and the force required in pounds per inch is recorded. In the boiling water test, bonded samples after having been scored at the bondline and prestressed by bending the rubber body back from the metal, are immersed in boiling water for 2 hours; and in the salt spray test, the samples, after scoring and prestressing, are exposed to a spray of salt solution (5% sodium chloride) for 48 hours at 100° F. The samples so treated are tested for relative bond strength by pulling the rubber body from the metal.

In the data given in the examples, reference is made to failure in the rubber body (R), between the adhesive composition and the rubber (RC), between the adhesive composition and the primer (CP), between the primer and the metal (PM), or between the adhesive composition and the metal (CM) when no primer is listed. Failure is expressed in terms of percent, e.g., with no metal primer, 95R means that 95 percent of the failure occurred in the rubber body itself and not between the adhesive composition and the rubber (RC) or between the adhesive composition and the metal (CM).

EXAMPLE I

A 1,2-polybutadiene-hexachlorocyclopentadiene adduct is prepared by charging 25 g of 1,2-polybutadiene having a vinyl content of 92 percent, 63.1 g of hexachlorocyclopentadiene and 225 g of xylene to a reaction vessel equipped with a reflux condenser and stirrer. The mixture is stirred, heated to its reflux temperature and then heated at reflux for 35-½ hours. The reaction mixture is cooled to room temperature, precipitated in methanol, redissolved in xylene, reprecipitated in methanol, redissolved in a 2:1 blend of methyl isobutyl ketone and xylene, reprecipitated in methanol, filtered and dried. The resulting adduct of 1,2-polybutadienehexachlorocyclopentadiene has a chlorine content of 33.48 weight percent.

The adduct is dissolved in a 2:1 blend of methyl isobutyl ketone and xylene to provide an adhesion composition having a total solids content (TSC) of 25 percent. The adhesive is designated Adhesive I-A.

EXAMPLE II

A reaction vessel equipped with reflux condenser and stirrer is charged with 22.5 g 1,4-polybutadiene, 58 g hexachlorocyclopentadiene and 247.5 g xylene. The mixture is heated to reflux. At 136° C., reflux vigorously increases. 100 g of liquid is removed from the vessel and the remaining contents are diluted with 50 g xylene. The mixture is again heated to reflux, and heating at reflux is continued for 28 hrs. Gel particles are noted in the reaction mixture. The contents of the reactor, including the gel particles, are precipitated in methanol, redissolved in xylene, reprecipitated in methanol, filtered and dried. The dried reaction product smells strongly of unreacted hexachlorocyclopentadiene. The hexachlorocyclopentadiene adduct of 1,4-polybutadiene has a chlorine content of 34.11 weight percent.

The adduct is dissolved in a 2:1 blend of methyl isobutyl ketone and xylene to provide an adhesive composition having a total solids content (TSC) of 25 percent. The adhesive is designated adhesive II-A.

EXAMPLE III

Adhesive I-A and II-A are employed to bond natural rubber (62 durometer Shore A) and styrene-butadiene rubber (65 durometer Shore A) to grit-blasted, cold-rolled steel. In all cases, the Example I and Example IV, compositions are coated onto the steel substrates and a film thickness of 1.0 mil. The assemblies are cured at 154° C. for 15 minutes with precure heat exposure times of zero and 5 minutes. Primary adhesion was measured following the procedure of ASTM D-429 (Method B, modified to 45°) with the following results:

| Adhesive Material | ELASTOMER ADHESION | | | |
|---|---|---|---|---|
| | Natural Rubber | | Styrene-Butadiene Rubber | |
| | Precure Heat Exposue, Minutes @ 154° C. | | | |
| | Zero | Five | Zero | Five |
| I-A | 68#;100R | 47#;99R,1RC | 155#;100R | 165#;99R, 1RC |
| II-A | 29#;100CM | 33H;100CM | 48#;100CM | 64#;100CM |

The data clearly shows that adducts of halogenated cyclic diolefins and high vinyl dienophiles provide a result which is not attainable with adducts of halogenated cyclic diolefins and dienophiles which do not have a high vinyl content.

EXAMPLE IV

Adducts of hexachlorocyclopentadiene and 1,2-polybutadiene homopolymer having a vinyl content of 92 percent are prepared by charging to a reactor equipped with stirrer and reflux condenser 79.8 g 1,2-polybutadiene, 201.5 g hexachlorocyclopentadiene and 718.7 g xylene. The reactor is heated to reflux and samples are taken at the following intervals:

| Sample | A | B | C | D | E | F | G | H | I |
|---|---|---|---|---|---|---|---|---|---|
| Time (hrs.) | 4 | 8 | 12 | 16 | 17 | 19 | 21 | 23 | 25 |

Each sample is precipitated in methanol, redissolved in xylene, reprecipitated in methanol, redissolved in a 2:1 blend of methyl ethyl ketone and xylene, reprecipitated in methanol, filtered, washed and dried. The samples are analyzed for chlorine content and the extend of hexachlorocyclopentadiene grafting is calculated. The results are as follows:

| Sample | A | B | C | D | E | F | G | H | I |
|---|---|---|---|---|---|---|---|---|---|
| Cook time (hrs.) | 4 | 8 | 12 | 16 | 17 | 19 | 21 | 23 | 25 |
| % Chlorine (wt %) | 10.5 | 17.3 | 21.2 | 25.2 | 26.3 | 27.5 | 29.0 | 31.6 | 33.3 |
| % Hexachloro-cycle-pentadiene (wt. %) | 13.5 | 22.2 | 27.2 | 32.3 | 33.7 | 35.3 | 37.2 | 40.5 | 42.6 |

Each sample is dissolved in a 2:1 blend of methyl ethyl ketone and xylene to provide an adhesive composition having a total solids content of 25 percent.

The adhesives are employed to bond a standard natural rubber (55–60 durometer Shore A) and a soft natural rubber (36–40 durometer Shore A) to grit-blasted cold rolled steel. In all cases, the adhesive composition is coated onto the steel substrate at a film thickness of 1.0 mil. The 55–60 durometer Shore A natural rubber assemblies are cured at 162° C. for 25 minutes, whereas the 35–40 durometer Shore A natural rubber assemblies are cured at 162° C. for 10 minutes. No primer was used. Adhesive was measured following the procedure of ASTM D-429 (Method B, modified to 45°) with the following results:

| Sample | A | B | C | D | E | F | G | H | I |
|---|---|---|---|---|---|---|---|---|---|
| | 55-60 Durometer Shore A Natural Rubber | | | | | | | | |
| Lbs. Pull | PBH[a] | PBH | PBH | PBH | 24 | 45 | 42 | 42 | 47 |
| % Rubber | 0 | 0 | 0 | 0 | 3 | 87 | 91 | 93 | 95 |
| % Rubber-Adhesive | 0 | 0 | 0 | 0 | 0 | 0 | 0 | 0 | 0 |
| % Adhesive-Metal | 100 | 100 | 100 | 100 | 97 | 13 | 9 | 7 | 5 |
| | 35-40 Durometer Shore A Natural Rubber | | | | | | | | |
| Lbs. Pull | 14 | 7 | 4 | 20 | 34 | 33 | 37 | 26 | 17 |
| % Rubber | 0 | 0 | 0 | 0 | 88 | 100 | 100 | 0 | 0 |
| % Rubber-Adhesive | 0 | 0 | 0 | 0 | 12 | 0 | 0 | 100 | 100 |
| % Adhesive-Metal | 100 | 100 | 100 | 100 | 0 | 0 | 0 | 0 | 0 |

[a]Pulled by Hand

The results demonstrate that significant metal adhesion is attained at chlorine levels in excess of 26 percent and further indicate the relationship between chlorine level and type of rubber being bonded.

When the adhesives are employed to bond the 55-60 durometer Shore A natural rubber to grit-blasted cold-rolled steel at a precure residence time of 5 minutes at 162° C., the following results are obtained:

| | 55-60 Durometer Shore A Natural Rubber Precure Heat Exposure for 5 minutes @162° C. | | | | | | | | |
|---|---|---|---|---|---|---|---|---|---|
| Sample | A | B | C | D | E | F | G | H | I |
| Lbs. Pull | PBH | PBH | PBH | 18 | 42 | 43 | 40 | 39 | 39 |
| % Rubber | 0 | 0 | 0 | 4 | 50 | 99 | 96 | 61 | 88 |
| % Rubber-Adhesive | 0 | 0 | 0 | 0 | 0 | 0 | 0 | 0 | 0 |
| % Adhesive-Metal | 100 | 100 | 100 | 96 | 50 | 1 | 5 | 9 | 12 |

This data confirms the % chlorine to adhesion relationship previously noted, supra.

EXAMPLE V

Samples E and G of Example IV and two commercial adhesives are employed to bond 35-40 durometer Shore A natural rubber and 55-80 durometer Shore A semi-EV cure natural rubber to grit blasted cold rolled steel. The 35-40 durometer Shore A natural rubber assemblies are cured at 162° C. for 10 minutes with precure heat exposures of 0 minutes, 5 minutes and 10 minutes at 162° C. The 55-80 durometer Shore A semi-EV cure natural rubber assemblies are cured at 162° C. for 15 minutes with precure heat exposures of 0 minutes, 10 minutes and 20 minutes at 162° C. Primary adhesion is measured following the procedure of ASTM D-429 (Method B, modified to 45°) with the following results:

| Adhesive | 35-40 Durometer Shore A Natural Rubber Precure Heat Exposure, Minutes at 162° C. | | |
|---|---|---|---|
| | 0 | 5 | 10 |
| Commercial A[1] | 38#;100R | 18#;100RC | PBH;100RC |
| Commercial B[2] | 42#;85R;5RC | 23#;100RC | 25#;100RC |
| Sample 5/ Ex. IV[3] | 45#;97R;3CM | 52#;98R,2RC | 30#;100RC |
| Sample 7 | 40#;40R;60RC | 40#;32R,68RC | 23#;100RC |
| EX 14[3] | | | |

| Adhesive | 55-80 Durometer Shore A Semi-EV Cure Natural Rubber Precure Heat Exposure, Minutes at 162° C. | | |
|---|---|---|---|
| | 0 | 10 | 20 |
| Commercial A | 53#;100R | 26#;100RC | PBH;100RC |
| Commercial B | 56#;100R | 45#;100RC | 37#;100Rc |
| Sample 5/ Ex. IV | 57#95R,5CM | 46#;90R,10RC | PBH;100RC |
| Sample 7/ Ex. IV | 58#95R,5CM | 36#;42R,58RC | PBH;100RC |

[1]Chlorinated elastomer-based adhesive based on teaching of Coleman et al U.S.A. Patent 3,258,388; applied over a phenolic resin-based primer.
[2]Hexachlorocyclopentadiene copolymer-based adhesive based on teaching of Findley et al U.S.A. Patent 3,640,941; no primer.
[3]No primer.

The data are self-explanatory and clearly shows the dependence of adhesion upon chlorine content and type of elastomer being bonded. Generally, the softer the stock, the lower chlorine content may be with higher chlorine contents being favored for bonding stiffer elastomers.

What is claimed is:

1. An adhesive composition suitable for bonding elastomeric materials consisting essentially of
   (a) at least one Diels-Alder adduct of a chlorinated cyclic conjugated diene and 1,2 polybutadiene homopolymer having a vinyl content in the range from 88 to 98 percent, based on total unsaturation, and a molecular weight in the range from 500 to 200,000, and said Diels-Alder adduct has a halogen content in the range from 26 to 35 weight percent, based on total weight of said Diels-Alkder adduct; and
   (b) An inert solvent, said solvent being present in an amount to provide a lacquer composition suitable for use as an adhesive suitable for bonding elastomeric materials, said lacquer having a total solids content in the range from 5 to 40 percent.

2. An adhesive composition in accordance with claim 1 wherein siad halogenated cyclic conjugated diene comprises hexachlorocyclopentadiene.

* * * * *